United States Patent
Kim et al.

(10) Patent No.: US 11,286,991 B2
(45) Date of Patent: Mar. 29, 2022

(54) WHEEL BEARING SEAL HAVING AN INTEGRATED OUTER SEAL

(71) Applicant: Schaeffler Technologies AG & Co. KG, Herzogenaurach (DE)

(72) Inventors: Hyunjae Kim, Changwon (KR); Daekyoung Lee, Busan (KR); Alexander Häpp, Hofheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 425 days.

(21) Appl. No.: 16/336,510

(22) PCT Filed: Jul. 5, 2017

(86) PCT No.: PCT/DE2017/100560
§ 371 (c)(1),
(2) Date: Mar. 26, 2019

(87) PCT Pub. No.: WO2018/054416
PCT Pub. Date: Mar. 29, 2018

(65) Prior Publication Data
US 2021/0293277 A1    Sep. 23, 2021

(30) Foreign Application Priority Data

Sep. 26, 2016 (DE) .......................... 102016218450.4

(51) Int. Cl.
*F16C 33/78* (2006.01)
*F16J 15/32* (2016.01)
(Continued)

(52) U.S. Cl.
CPC ........ *F16C 33/783* (2013.01); *B60B 27/0073* (2013.01); *F16C 33/782* (2013.01); *F16C 33/7826* (2013.01); *F16C 33/7886* (2013.01); *F16J 15/3232* (2013.01); *F16C 2226/40* (2013.01); *F16C 2240/46* (2013.01); *F16C 2326/02* (2013.01)

(58) Field of Classification Search
CPC .. F16C 33/783; F16C 33/782; F16C 33/7886; F16C 33/7826; F16C 33/80; F16C 33/7846; F16C 2240/46; F16C 2326/02; F16C 2226/40; F16J 15/3232; F16J 15/3268; F16J 15/447; B60B 27/0073; B60B 2900/511
USPC ............... 384/489, 484, 486, 488, 544, 589; 277/351, 549
See application file for complete search history.

(56) References Cited

U.S. PATENT DOCUMENTS 8,905,641 B2    12/2014  Duch et al.
8,979,385 B2 *  3/2015   Haepp .................. F16C 33/583
                                                 384/480
(Continued)

FOREIGN PATENT DOCUMENTS

CN    102378698 A    3/2012
CN    103348153 A    10/2013
(Continued)

*Primary Examiner* — Marcus Charles (57) ABSTRACT

A sealing device and a sealing arrangement which creates an improved outer seal in front of the sealing lips, for example, wherein the outer seal can be used in a confined space and affords an enhanced sealing effect for a low coefficient of friction and/or ease of fitting

9 Claims, 4 Drawing Sheets

(51) Int. Cl.
  *B60B 27/00*   (2006.01)
  *F16J 15/3232*  (2016.01)

(56) References Cited

U.S. PATENT DOCUMENTS

| | | | | |
|---|---|---|---|---|
| 10,663,003 B2 * | 5/2020 | Kato | ............... | F16J 15/447 |
| 2007/0076994 A1 * | 4/2007 | Norimatsu | .......... | F16C 33/7896 |
| | | | | 384/486 |
| 2007/0147718 A1 * | 6/2007 | Takimoto | ............... | F16J 15/164 |
| | | | | 384/486 |
| 2007/0278748 A1 * | 12/2007 | Matsui | ............... | F16C 33/7876 |
| | | | | 277/549 |
| 2012/0007316 A1 * | 1/2012 | Terasawa | ............ | F16C 33/7886 |
| | | | | 277/361 |
| 2013/0241270 A1 * | 9/2013 | Morita | ............... | F16C 33/7879 |
| | | | | 301/110 |
| 2016/0003302 A1 * | 1/2016 | Seno | ................... | F16C 33/7886 |
| | | | | 277/351 |
| 2016/0131257 A1 * | 5/2016 | Sakai | ................. | B60B 27/0073 |
| | | | | 277/351 |
| 2016/0178010 A1 * | 6/2016 | Kaiser | ................ | F16C 33/7823 |
| | | | | 277/351 |
| 2016/0186815 A1 * | 6/2016 | Walter | ................ | F16C 33/783 |
| | | | | 277/351 |
| 2016/0245340 A1 * | 8/2016 | Kaiser | ................ | F16C 33/7863 |
| 2018/0066711 A1 * | 3/2018 | Wakabayashi | ...... | F16C 33/7876 |
| 2018/0186181 A1 * | 7/2018 | Tada | .................... | F16J 15/3232 |

FOREIGN PATENT DOCUMENTS

| | | | |
|---|---|---|---|
| CN | 103671501 A | 3/2014 | |
| CN | 104565081 A | 4/2015 | |
| CN | 105587774 A | 5/2016 | |
| DE | 102013218635 A1 * | 3/2015 | .......... F16C 33/7826 |
| DE | 102014211191 A1 | 12/2015 | |
| DE | 212014000153 U1 | 2/2016 | |
| DE | 102015118333 A1 | 5/2016 | |
| DE | 102016124571 A1 * | 6/2018 | ........... F16C 33/783 |
| EP | 3040566 A1 | 7/2016 | |
| JP | 2006010055 A | 1/2006 | |
| JP | 2010038346 A | 2/2010 | |
| JP | 2010210085 A | 9/2010 | |
| JP | 2012131452 A | 7/2012 | |
| JP | 2013072553 A | 4/2013 | |
| JP | 2014173678 A | 9/2014 | |
| JP | 2015132362 A | 7/2015 | |
| JP | 2015158226 A | 9/2015 | |
| WO | WO-2017038890 A1 * | 3/2017 | ......... B60B 27/0073 |

* cited by examiner

WHEEL BEARING SEAL HAVING AN INTEGRATED OUTER SEAL

CROSS-REFERENCE TO RELATED APPLICATIONS

This application is the U.S. National Phase of PCT Appln. No. PCT/DE2017/100560 filed Jul. 5, 2017 which claims priority to DE102016218450.4 filed Sep. 26, 2016, the entire disclosures of which are incorporated by reference herein.

TECHNICAL FIELD

The disclosure relates to a sealing device for sealing two bearing elements which rotate relative to one another about an axis, in particular for sealing an antifriction bearing, wherein the sealing device comprises a first seal portion for sealing purposes, a fastening portion for holding the sealing device on a bearing element, and a second seal portion for sealing purposes.

The disclosure further relates to a sealing arrangement of an antifriction bearing, in particular a wheel bearing arrangement, having two bearing elements which rotate relative to one another about an axis, and having a sealing device, wherein an outer bearing element forms an outer race and an inner bearing element forms an inner race or a flange.

BACKGROUND

Such a sealing device or sealing arrangement is typically used in radial antifriction bearings, particularly in wheel bearings of wheel bearing units. In order to achieve a long service life, such a sealing device or sealing arrangement requires effective protection against external influences.

The external influences or environmental influences include foreign bodies, for example, such as sand and water, which when introduced into a wheel bearing or even into a sealing device increase the degree of wear in these. In particular, the wear to sealing lips of the sealing device or sealing arrangement is also increased, thereby increasing the risk that contamination getting into an antifriction bearing may lead to a significantly impaired service life and to the failure of a wheel bearing.

SUMMARY

The present disclosure, relates to a sealing device and a sealing arrangement which creates an improved outer seal in front of the sealing lips, for example, wherein the outer seal can be used in a confined space and affords an enhanced sealing effect for a low coefficient of friction and/or ease of fitting.

According to an example embodiment this object is achieved by the features of the independent patent claims. Further advantageous developments form the subject of the dependent claims.

According to another example embodiment, a sealing device for sealing two bearing elements which rotate relative to one another about an axis, in particular for sealing an antifriction bearing, comprises a first seal portion for sealing purposes, a fastening portion for holding the sealing device on a bearing element, and a second seal portion for sealing purposes.

The seal portions can be each arranged at an end of the fastening portion.

A further feature is if all portions have a common carrier element and a common sealing element.

The second seal portion comprises a protruding projection, which extends in a radial direction and an axial direction and which is formed by the sealing element.

The radial direction and the axial direction are oriented at a 90-degree angle to one another, wherein the axial direction is the direction in which an axis of the sealing device is oriented and about which the sealing device can be rotated. The sealing device is formed so that it is rotationally symmetrical about an axis which is oriented in an axial direction.

The projection comprises two outer faces, which each enclose an angle of between 5 and 55 degrees with the radial direction. In this way a seal gap, which is formed, for example, between an inner and an outer bearing element of a wheel bearing, for example, can be effectively protected from dirt and water or external influences. In other words, the particular configuration of the sealing device having the projection described makes it more difficult for foreign particles to penetrate as far as the sealing lips of a sealing device or to even pass at all in the direction of the inside of a wheel bearing, for example. Again, to put it another way, the projection reduces the seal gap and ideally increases the distance in a radial direction from an antifriction bearing, for example. Assisted by rotational forces or centrifugal forces, a seal gap can thereby also be kept free of lubricating fluid or water etc. This is because centrifugal forces, which have a discharging effect, increase with increasing distance from an axis of rotation/axle.

It is furthermore advantageous if the protruding projection is further formed by the carrier element, so that the sealing element together with the carrier element forms the projection. It is therefore possible to reinforce the sealing element by means of the carrier element, in order, for example, to ensure correct positioning of the projection in relation to a bearing element, for example.

The sealing element in the second seal portion envelops the carrier element in order to protect the carrier element from corrosion, for example.

The carrier element in the second seal portion may furthermore enclose an angle of between 0 and 90 degrees, in particular between 0 and 55 degrees, with the radial direction. In this way it is possible for the carrier element to stabilize and reinforce the projection in various positions relative to the radial direction.

The projection also comprises two tapering faces forming a point on the projection, wherein one of the two tapering faces runs substantially parallel to the radial direction. In particular, the formation of a face running substantially parallel to the radial direction makes it possible to achieve a small seal gap between the projection and the sealing device and a bearing element. This in turn means that only an insignificant amount of dirt and foreign particles can get into this seal gap.

The term "substantially parallel" is taken to mean a deviation of two ideally parallel faces or a deviation of one face from an idealized radial or axial direction, wherein the deviation of the two substantially parallel faces or of one face from a radial/axial direction may lie in the range of +/−5 degrees. In other words, in the present description faces or a face and an idealized direction (radial or axial direction) are regarded as "substantially parallel" if these intersect one another in the angle range of +5 degrees/−5 degrees.

Each of the tapering faces adjoins one of the two outer faces. This is an easy way of forming the projection, ideally tapering to a point.

The sealing element comprises an elastic sealing material, which encloses the carrier element on at least one side. The sealing material may be an elastomer, for example, which is suited to the particular range or field of application of a sealing device and therefore optimally withstands the external influences. In order to save costs, it is advantageous, as already mentioned, to enclose the carrier element with sealing material or the sealing element on at least one side, since this makes it possible to economize on manufacturing costs for the sealing material or sealing element. It is advantageous here if the carrier element is enclosed by the sealing element on the side on which the sealing device comes into contact, for example, with water, lubricating oil and/or foreign particles.

It is also advantageous if all portions are composed of subsegments which extend in a radial direction and/or in an axial direction. In this way it is possible to achieve a sealing device formed in any desired way in a radial and/or axial direction.

The fastening portion may furthermore be designed to hold the sealing device on a bearing element by adhesive grip and/or positive interlock. This represents an easy way of fastening the sealing device to a bearing element.

The adhesive grip and/or positive interlock holding the sealing device on a bearing element is achieved in that subsegments of the fastening portion and/or a seal portion, which extend in a radial and an axial direction, form a U-shaped circular disk for receiving a bearing element.

The adhesive grip and/or positive interlock holding the sealing device on a bearing element also achieved in that two subsegments of the fastening portion in the form of the carrier element and one subsegment of the second seal portion in the form of the sealing element form a U-shaped circular disk 7 or one of U-shaped cross section for receiving a bearing element.

It is furthermore advantageous if a subsegment of the fastening portion in the form of the carrier element extends in a radial direction and a further subsegment extends in an axial direction in order to form a U-shaped circular disk, wherein a subsegment of the second seal portion in the form of the sealing element extends in an axial direction. In this way, for example, the sealing device on a bearing element can be gripped by two faces of a subsegment of the fastening portion arranged substantially parallel and a subsegment of the second seal portion.

In this way the fastening portion, for example, designed as a U-shaped circular disk, can form a mounting in an axial direction, in particular for a bearing element. This facilitates attachment to a bearing element.

It is furthermore advantageous if the sealing device comprises a spacer in an axial direction, which comprises a centering. The spacer serves to prevent multiple sealing devices adhering together during transport, for example for delivery in an assembly operation. A spacer furthermore allows two sealing devices to be arranged in series for improved sealing. The centering here makes it possible to avoid imbalances occurring in the assembly process, so that intrusive vibrations in the operative wheel bearing can be prevented.

It is advantageous in this context if the centering is formed by a step combined with a limit stop. The limit stop, which is formed in an axial direction, here enables the correct distance to be set between two sealing devices. The step on the other hand allows optimum adjustment and positioning in a radial direction.

The spacer is arranged on the first seal portion and/or on the fastening portion. This fitting site facilitates the attachment of the spacer to the sealing device.

The spacer extends in an axial direction, so that it is possible to fix the position of two sealing devices arranged in series.

A second aspect of the disclosure consists in a sealing arrangement of an antifriction bearing, in particular a wheel bearing arrangement, having two bearing elements which rotate relative to one another about an axis, and having a sealing device, as is described under the first aspect of the disclosure.

It is expressly pointed out that the features of the sealing device, as mentioned under the first aspect, can be applied in the sealing arrangement either individually or in combination with one another.

In other words, the features relating to the sealing device specified above under the first aspect of the disclosure can also here be combined with further features of the sealing arrangement under the second aspect of the disclosure.

An outer bearing element forms an outer race, and an inner bearing element an inner race or flange.

It is furthermore advantageous if the outer bearing element comprises an end face in an axial direction, on which the sealing device with its fastening portion is arranged.

The inner bearing element comprises a sealing surface opposite the end face of the outer bearing element, giving rise to a seal gap between the sealing device and the sealing surface.

The seal gap separates the protruding projection of the sealing device, which is arranged on the outer bearing element, and the sealing surface of the inner bearing element by a distance of between 0.5 and 2.5 mm in an axial direction. A non-rubbing outer seal can thereby be formed between the protruding projection of the sealing device and the sealing surface of the inner bearing element. In this way external environmental influences such as foreign particles, oil or dirty water, for example, can easily be kept away from the seal gap or the sealing gap by the projection of the sealing device. Consequently, the service life of the entire sealing arrangement can be increased.

The seal gap is of multipart formation. In other words, the seal gap may also comprise multiple segments, which are oriented at various angles to one another.

It is also preferable for the seal gap, in particular a first part of the seal gap, to separate the tapering face of the projection, which is oriented substantially parallel to the radial direction, and a portion of the sealing surface, which is oriented substantially parallel to the tapering face of the projection, by a distance of between 0.5 and 1.5 mm in an axial direction.

The seal gap, in particular a second part of the seal gaps, separates the outer face of the projection of the sealing device, which encloses an angle of between 0 and 55 degrees with the radial direction, and a portion of the sealing surface, which is oriented substantially parallel to the outer face of the projection, by a distance of between 0.5 and 2.5 mm.

The seal gap, in particular a third part of the seal gap, to separate a face of the sealing device, which is arranged on the end face of the outer bearing element and is oriented substantially parallel to the radial direction, and a portion of the sealing surface, which is oriented substantially parallel to the end face, by a distance of between 0.5 and 2.5 mm.

In a radial direction the first part of the seal gap is more distant from an axis of rotation or axle than the second part. The second part of the seal gap, on the other hand, is more distant radially from an axis of rotation or axle than the third part. The third part of the seal gap adjoins the second part and the second part adjoins the third part.

The disclosure represented above is expressed in other words below.

This idea is directed towards improving the working principle of an outer seal.

Here the idea of the example embodiment relates—in simple terms—to a sealing device having an additional projection or having an additional, integrated deflector, which as outer seal acts both in an axial and in a radial direction and therefore improves the sealing effect with integral overflow.

BRIEF DESCRIPTION OF THE DRAWINGS

The disclosure is -explained in more detail below with reference to exemplary embodiments in conjunction with associated drawings, of which:

FIGS. 1A to 2B schematically show a sectional view of a sealing device and sealing arrangement according to a first exemplary embodiment;

DETAILED DESCRIPTION

In the following description the same reference numerals are used for identical items.

FIGS. 1A to 2B show a sectional view of a sealing device 1 according to a first exemplary embodiment.

FIGS. 1A to 2B more specifically show a sealing device 1 for sealing two bearing elements 51, 52 of an antifriction bearing rotating relative to one another about an axis X.

Here the sealing device 1 comprises a first seal portion 10 for sealing purposes, a fastening portion 20 for holding the sealing device 1 on the bearing element 51 and a second seal portion 30 for sealing purposes.

The seal portions 10, 30 are each arranged at an end of the fastening portion 20, wherein all portions 10, 20, 30 have a common carrier element 2 and a common sealing element 3.

All portions 10, 20, 30 are composed of subsegments, which extend in a radial direction R and/or in an axial direction A.

Here the fastening portion 20 is designed to hold the sealing device 1 on the bearing element 51 by adhesive grip and/or positive interlock.

According to FIGS. 1A to 2B holding is achieved in that subsegments of the fastening portion 20 and of the second seal portion 30, which extend in a radial direction R and in an axial direction A, form a circular disk 7 of U-shaped cross section for receiving the bearing element 51.

In more precise terms, two subsegments of the fastening portion 10 in the form of the carrier element 2, and a subsegment of the second seal portion 30 in the form of the sealing element 3 form the U-shaped circular disk 7 for receiving the bearing element 51. Here the carrier element 2 extends in an axial and in a radial direction A, R, wherein the sealing element 3 extends substantially in an axial direction A.

The U-shaped circular disk 7 of the fastening portion 20, which forms a mounting in an axial direction A for the bearing element 51, serves to hold the bearing element 51 by adhesive grip.

FIGS. 1A to 2B furthermore also show that on the attachment of a spacer 8, at which the spacer 8 is connected to the fastening portion 20, a projection of the sealing element 3 engages in a pocket of the bearing element 51 to provide a positive interlock It can also be seen that the sealing element 3 in the second seal portion 30 envelops the carrier element 2 on the bearing element 52 side. The carrier element 2 in the fastening portion 20, on the other hand, bears directly on the bearing element 51.

The sealing element 3 is composed of an elastic sealing material, which completely envelops or encloses the carrier element 2 in the first and second seal portion 10, 30 and fastening portion 20 encloses the carrier element 2 on one side.

Figure 1A:
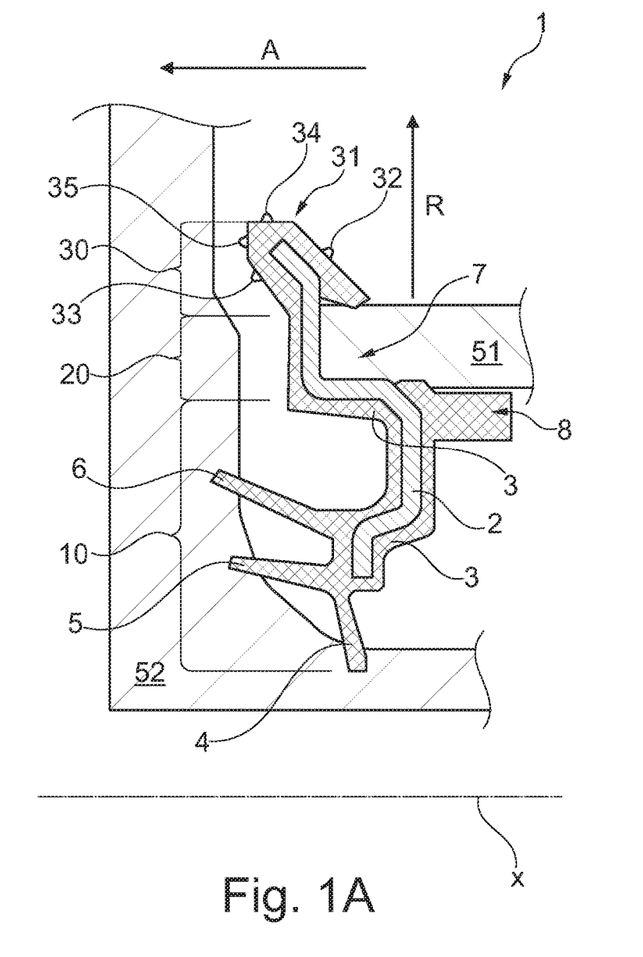
Figure 1B:
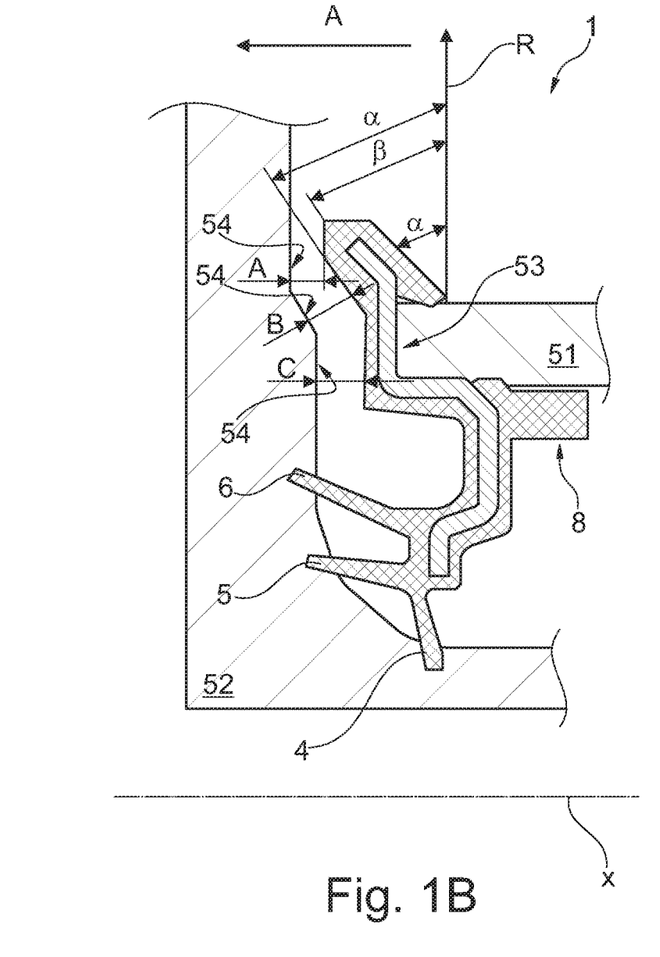

It can further be seen in FIGS. 1A to 1B that the second seal portion 30 comprises a protruding projection 31, which extends in a radial and in an axial direction R, A and which is formed by the sealing element 3.

The projection 31 here comprises two outer faces 32, 33, which each enclose an angle $\alpha$ (see FIG. 1B) of 55 degrees with the radial direction R. Other angles are obviously also possible, it also being feasible for the one outer face 32 to enclose a different angle with the radial direction R from that of the other outer face 33.

FIGS. 1A to 1B furthermore show that the projection 31 comprises two tapering faces 34, 35, forming a point on the projection 31.

Here the tapering face 35 runs substantially parallel to the radial direction R.

Furthermore, each of the tapering faces 34, 35 adjoins one of the two outer faces 32, 33. Thus the tapering face 34 adjoins the outer face 32 and the tapering face 35 adjoins the outer face 33.

Looking at FIGS. 1A to 1B, these also show that the protruding projection 31 is furthermore formed by the carrier element 2, so that the sealing element 3 together with the carrier element 2 forms the projection 31.

The carrier element 2 in the second seal portion 30 likewise encloses an angle of 55 degrees with the radial direction R. It is also feasible, however, for the carrier element 2 in the second seal portion 30 to enclose an angle of 90° with the radial direction R, other angles of between 0 and 90 degrees obviously also being feasible.

Besides the sealing device 1, FIGS. 1A to 2B likewise show a sealing arrangement 50 of an antifriction bearing having two bearing elements 51, 52, rotating relative to one another about an axis X, and the sealing device 1 already described.

Here an outer bearing element 51 forms an outer race and an inner bearing element 52 forms an inner race or a flange.

The outer bearing element 51, in an axial direction A, has an end face 53 on which the sealing device 1 with its fastening portion 20 or with the U-shaped circular disk 7 is arranged for receiving the bearing element 51.

The inner bearing element 52 has a sealing surface 54 opposite the end face 53 of the outer bearing element 51, giving rise to a seal gap A, B, C or a multipart seal gap A, B, C between the sealing device 1 and the sealing surface 54.

The seal gap A, B, C separates the protruding projection 31 of the sealing device 1 and the sealing surface 54 of the outer bearing element 51 in axial direction A, in order to form a non-rubbing outer seal between the protruding projection 31 of the sealing device 1 and the sealing surface 54 of the inner bearing element 52.

A first part A of the seal gap separates the tapering face 35 of the projection 31, which is oriented substantially parallel to the radial direction R, and a portion of the sealing surface 54, which is oriented substantially parallel to the tapering face 35 of the projection 31, by a distance of 1.0 mm in an axial direction A.

A second part B of the seal gap separates the outer face 33 of the projection 31 of the sealing device 1, which encloses an angle 0 of 55 degrees with the radial direction R, and a portion of the sealing surface 54, which is oriented substantially parallel to the outer face 33 of the projection 31, by a distance of 1.5 mm.

A third part C of the seal gap separates a face of the sealing device 1, which is arranged on the end face 53 of the outer bearing element 51 and is oriented substantially in a radial direction R, and a portion of the sealing surface 54, which is oriented substantially parallel to the end face 53, 1.8 mm.

Figure 2A:
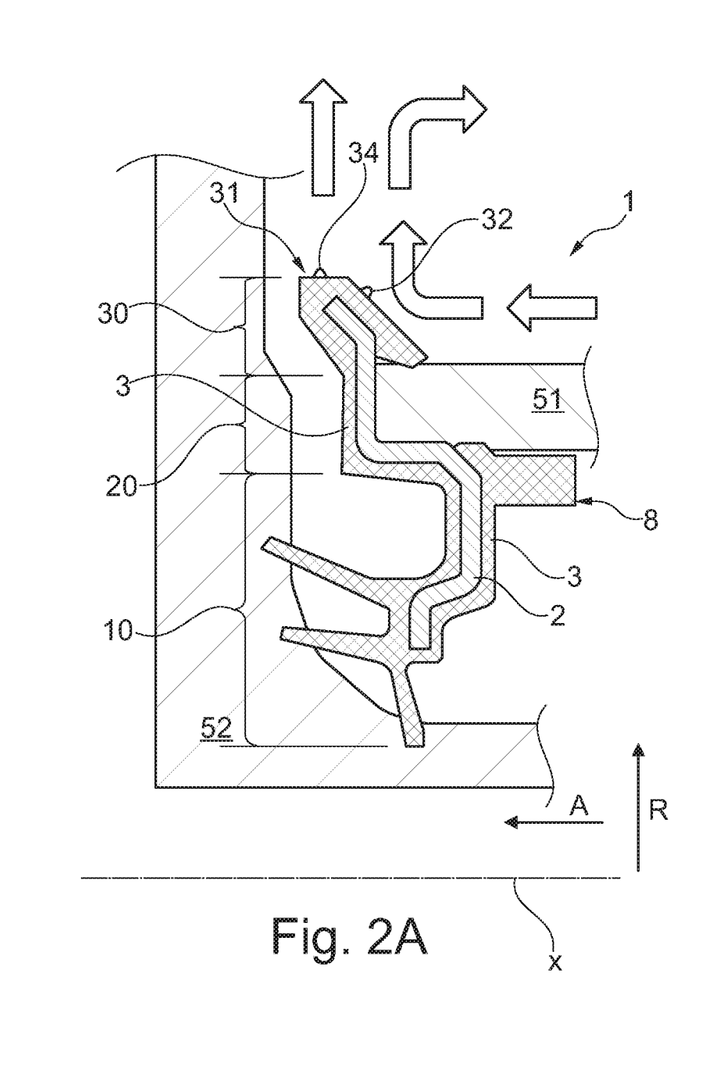
Figure 2B:
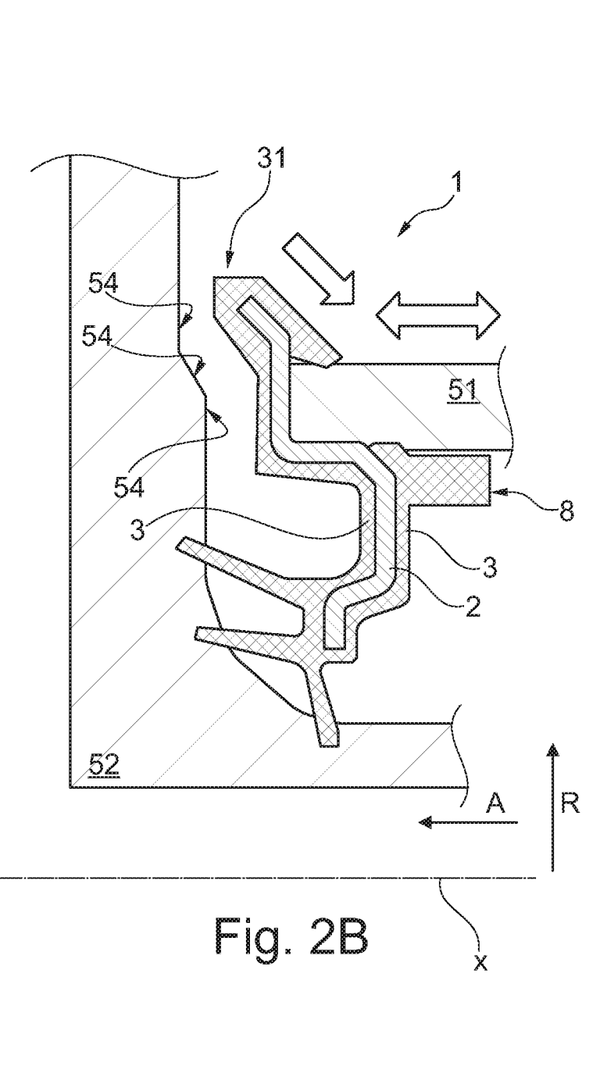

FIGS. 2A and 2B show the sealing device 1 and the sealing arrangement 50 in various states.

Thus, it is indicated by means of arrows in FIG. 2A how a lubricating fluid, for example oil, behaves in the event of a rotation of the bearing element 51.

The arrows in FIG. 2A therefore indicate that, under rotation, the seal gap A, B, C ideally remains free of the lubricating fluid and dirt particles, since with the aid of the rotational forces or centrifugal forces the projection 31 of the sealing device 1, which rotates together with the bearing element 51, keeps the seal gap A, B, C free of lubricating fluid.

Here, although the lubricating fluid is able to migrate along the projection 31, that is to say from the bearing element 51 to the faces 34, 35, tapering to a point, it will then have been expelled radially outwards from the projection 31 by the time it reaches there, since with increasing distance from the axis of rotation X or the axle X there is an increase in centrifugal force, which has the effect of transporting it away from the seal gap A, B, C.

In contrast to this, FIG. 2B shows the sealing arrangement 50 and the sealing device 1 in the resting state, in which the bearing element 51 is not moving.

In this case the projection 31, together with the bearing element 51, forms a trough, in which lubricating fluid can collect, likewise keeping this away from the seal gap A, B, C.

Figure 3A:
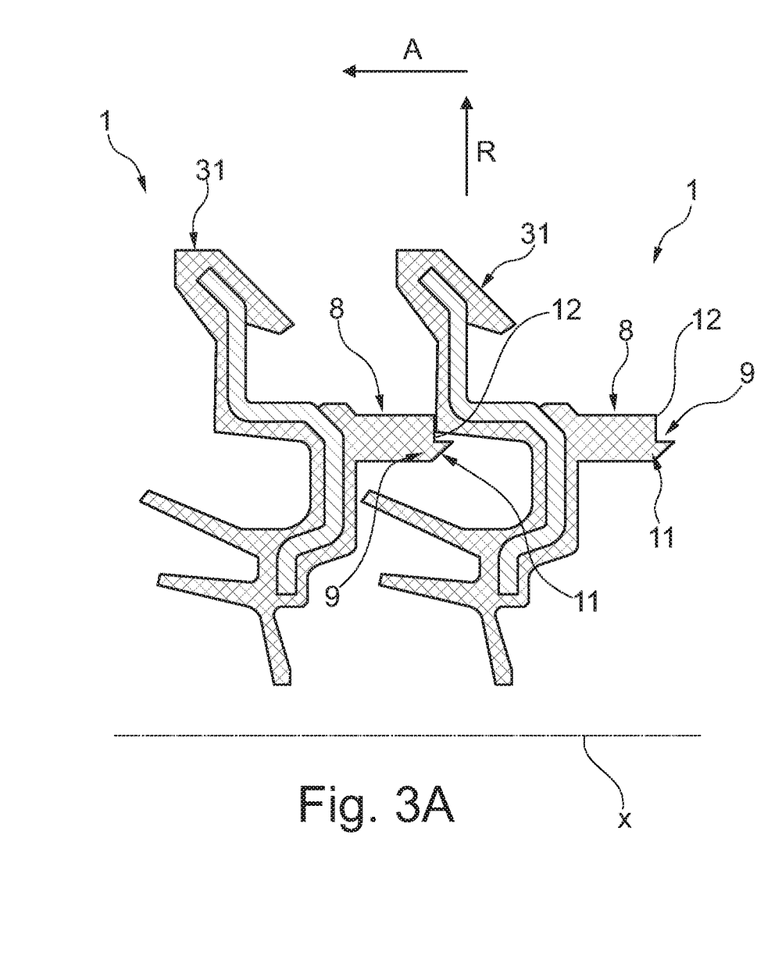
FIG. 3A schematically shows a sectional view of an arrangement in series of two sealing devices according to a first exemplary embodiment.

FIG. 3A shows a sectional view of an arrangement in series of two sealing devices 1 according to a first exemplary embodiment.

In this case the sealing device 1 has a spacer 8 in an axial direction A, which comprises a centering 9.

The centering 9 is formed by a step 11 combined with a limit stop 12, wherein the spacer 8 is arranged on the first seal portion 10 or on the fastening portion 20 or on the transition between the seal portion 10 and the fastening portion 20. Here the spacer 8 extends in an axial direction A.

The spacer 8 and its limit stop 12 allows the sealing devices 1 to be arranged in series at the ideal distance apart in the direction of the axle X or in the axial direction A. The step 11, on the other hand, assists in the correct positioning of the two sealing arrangements relative to one another in a radial direction R.

Figure 3B:
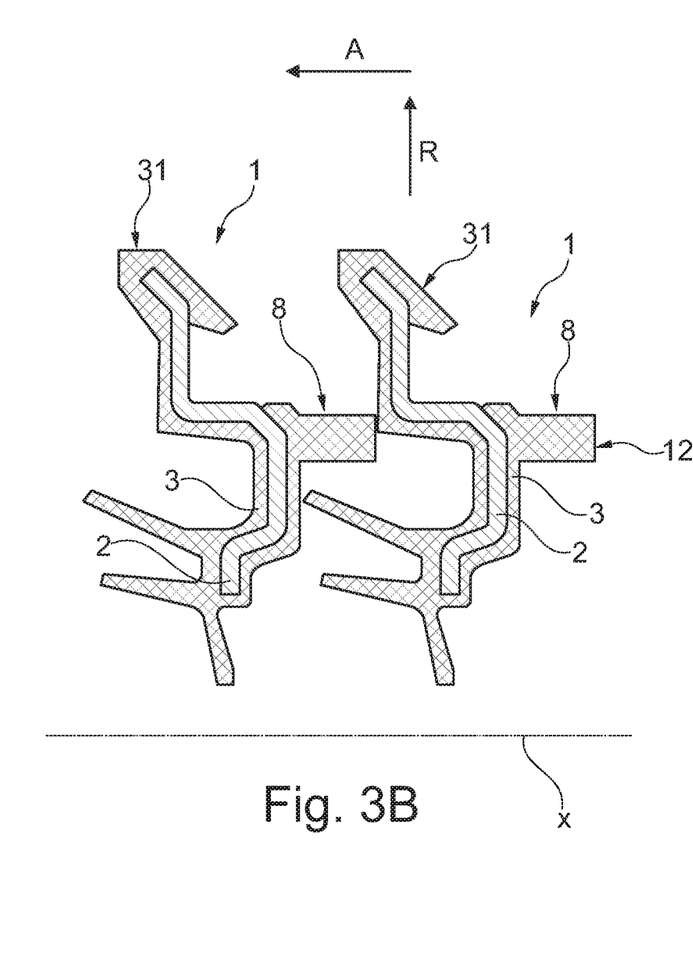
FIG. 3B schematically shows a sectional view of an arrangement in series of two sealing devices according to a second exemplary embodiment.

FIG. 3B shows a sectional view of an arrangement in series of two sealing devices 1 according to a second exemplary embodiment.

In contrast to the sealing device in 1 according to FIG. 3A, the sealing devices 1 in the second exemplary embodiment lack the centering 9 with the step 11. Otherwise the sealing devices according to the second exemplary embodiment are identical to those in FIG. 3A, so that for further explanations reference is made to the description of FIG. 3A.

Figure 4:
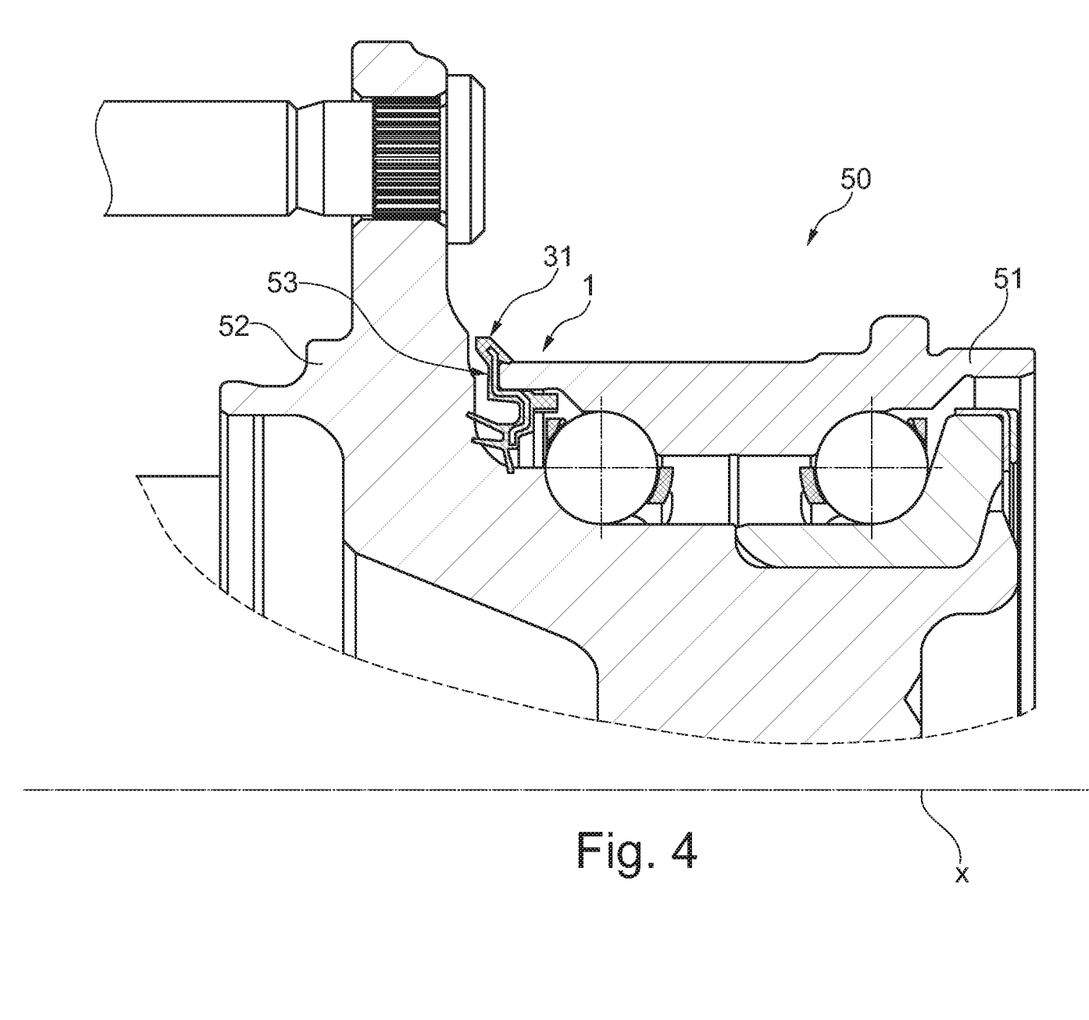
FIG. 4 a sealing arrangement.

FIG. 4 shows a sealing arrangement 50 in a wider context, i.e. showing the rolling elements of an antifriction bearing, which allow a rotation of the bearing element 51, in the form of an outer race, relative to the bearing element 52, in the form of an inner race or flange.

Furthermore, the sealing device 1 with its projection 31 and the end face 53 are provided with reference numerals, so as to be able to relate the sealing device 1 in FIG. 4 more precisely to FIGS. 1A to 3B.

Finally, it is pointed out that the sealing device according to FIGS. 1A to 4, comprises three sealing lips 4, 5, 6 in the first seal portion 10.

Here the sealing lip 4 extends substantially in a radial direction, whereas the sealing lips 5, 6 extend substantially in an axial direction.

LIST OF REFERENCE NUMERALS 1 sealing device
2 carrier element
3 sealing element
4 sealing lip
5 sealing lip
6 sealing lip
7 circular disk
8 spacer
9 centering
10 first seal portion
11 step
12 limit stop
20 fastening portion
30 second seal portion
31 projection
32 outer face
33 outer face
34 face
35 face
50 sealing arrangement
51 bearing element
52 bearing element
53 end face
54 sealing surface
X axis of rotation/axle
A axial direction
R radial direction
α angle
β angle

The invention claimed is:

1. A sealing device for sealing an antifriction bearing, wherein the sealing device comprises:
 a first seal portion for sealing purposes;
 a fastening portion for holding the sealing device on a bearing element, and
 a second seal portion for sealing purposes
 wherein the first and second seal portions are each arranged at an end of the fastening portion;
 wherein the first and second seal portions have a common carrier element and a common sealing element,
 wherein the sealing element in the second seal portion envelops the carrier element
 wherein the second seal portion comprises a protruding projection, which extends in a radial and an axial direction and which is formed by the sealing element and the carrier element; wherein the carrier element in the second seal portio encloses an angel (β) of between 0 and 90 degrees with the radial direction (R);

the projection comprises two outer faces, which each enclose an angle (α) of between 5 and 55 degrees with the radial direction.

2. The sealing device of claim 1, wherein the projection further comprises two tapering faces, forming a point on the projection;

wherein one of the two tapering faces runs parallel to the radial direction (R);

wherein each of the tapering faces adjoins one of the two outer faces;

wherein the sealing element comprises an elastic sealing material, which encloses the carrier element on at least one side.

3. The sealing device of claim 1, wherein all portions are composed of subsegments, which extend in the radial direction and/or in the axial direction;

wherein the fastening portion is designed to hold the sealing device on the bearing element by adhesive grip and/or positive interlock;

wherein subsegments of the fastening portion and/or a seal portion, which extend in the radial direction and the axial direction, form a U-shaped disk for receiving the bearing element;

wherein two subsegments of the fastening portion in the form of the carrier element and a subsegment of the second seal portion in the form of the sealing element form the U-shaped disk for receiving the bearing element.

4. The sealing device as claimed in claim 3, wherein a subsegment of the fastening portion in the form of the carrier elements extends in the radial direction and a further subsegment extends in an axial direction in order to form the U-shaped disk, and wherein the subsegment of the second seal portion in the form of the sealing element extends in an axial direction (A);

wherein the fastening portion, designed as the U-shaped disk, forms a mounting in the axial direction.

5. A sealing arrangement of an antifriction bearing having two bearing elements which rotate relative to one another about an axis (X), comprising:, a sealing device, comprising:

a first seal portion for sealing purposes;

a fastening portion for holding the sealing device on a bearing element; and a second seal portion for sealing purposes;

wherein the seal portions are each arranged at an end of the fastening portion;

wherein all portions have a common carrier element and a common sealing element;

wherein the second seal portion comprises a protruding projection, which extends in a radial and an axial direction and which is formed by the sealing element; and the projection comprises two outer faces, which each enclose an angle (a) of between 5 and 55 degrees with the radial direction;

wherein an outer bearing element forms an outer race and an inner bearing element forms an inner race;

wherein the outer bearing element comprises an end face in the axial direction, on which the sealing device with its fastening portion is arranged;

wherein the sealing device comprises a spacer in an axial direction, which comprises a centering;

wherein the centering is formed by a step combined with a limit stop;

wherein the spacer is arranged on the first seal portion and/or on the fastening portion;

wherein the spacer extends in an axial direction (A);

wherein the inner bearing element comprises a sealing surface opposite the end face of the outer bearing element, giving rise to a seal gap between the sealing device and the sealing surface; and the seal gap separates the protruding projection of the sealing device and the sealing surface of the inner bearing element by a distance of between 0.5 and 2.5 mm in an axial direction, in order to form a non-rubbing outer seal between the protruding projection of the sealing device and the sealing surface of the inner bearing element.

6. The sealing arrangement of claim 5, wherein a first part of the seal gap, separates the tapering face of the projection, which is oriented parallel to the radial direction , and a portion of the sealing surface, which is oriented parallel to the tapering face of the projection, by a distance of between 0.5 and 1.5 mm in an axial direction.

7. The sealing arrangement of claim 5, wherein a second part of the seal gap, separates the outer face of the projection of the sealing device, which encloses an angle of between 0 and 55 degrees with the radial direction , and a portion of the sealing surface, which is oriented parallel to the outer face of the projection, by a distance of between 0.5 and 2.5 mm.

8. The sealing arrangement of claim 5, wherein a third part of the seal gap, separates a face of the sealing device, which is arranged on the end face of the outer bearing element and is oriented parallel to the radial direction , and a portion of the sealing surface, which is oriented substantially parallel to the end face, by a distance of between 0.5 and 2.5 mm.

9. A bearing seal comprising:

a first seal portion;

a fastening portion;

a second seal portion;

the seal portions arranged at opposite ends of the fastening portion;

wherein the first and second portions have a common carrier element and a common sealing element, wherein the second seal portion comprises a protruding projection, which extends in a radial and an axial direction and which is formed by the sealing element; and the projection comprises two outer faces, which each enclose an angle of between 5 and 55 degrees with the radial direction.

* * * * *